(12) United States Patent
Suzuki et al.

(10) Patent No.: US 9,208,320 B2
(45) Date of Patent: Dec. 8, 2015

(54) SOFTWARE DISTRIBUTION SYSTEM AND SOFTWARE DISTRIBUTION METHOD

(71) Applicant: TOYOTA JIDOSHA KABUSHIKI KAISHA, Toyota-shi, Aichi-ken (JP)

(72) Inventors: Masaru Suzuki, Tokyo (JP); Masaharu Akei, Kawasaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/399,750

(22) PCT Filed: May 10, 2013

(86) PCT No.: PCT/JP2013/063162
§ 371 (c)(1),
(2) Date: Nov. 7, 2014

(87) PCT Pub. No.: WO2013/168797
PCT Pub. Date: Nov. 14, 2013

(65) Prior Publication Data
US 2015/0128259 A1    May 7, 2015

(30) Foreign Application Priority Data
May 10, 2012  (JP) .................................. 2012-108671

(51) Int. Cl.
*G06F 21/57*  (2013.01)
*G06F 21/56*  (2013.01)
(Continued)

(52) U.S. Cl.
CPC ............... *G06F 21/572* (2013.01); *G06F 8/60* (2013.01); *G06F 21/566* (2013.01); *G06F 21/57* (2013.01); *H04L 63/145* (2013.01); *H04L 67/10* (2013.01); *G06F 2221/033* (2013.01)

(58) Field of Classification Search
CPC . G06F 21/57; G06F 21/572; G06F 2221/033; G06F 21/566; G06F 8/60; H04L 67/10; H04L 63/145
USPC ....................................... 726/22, 24; 717/127
See application file for complete search history.

(56) References Cited

U.S. PATENT DOCUMENTS 4,168,796 A * 9/1979 Fulks et al. .................... 714/734
4,194,113 A * 3/1980 Fulks et al. .................... 714/732
(Continued)

FOREIGN PATENT DOCUMENTS

| JP | 2002-229790 A | 8/2002 |
| JP | 2003-283494 A | 10/2003 |
| JP | 2013-077048 | 4/2013 |

*Primary Examiner* — Haresh N Patel
(74) *Attorney, Agent, or Firm* — Finnegan, Henderson, Farabow, Garrett & Dunner, LLP (57) ABSTRACT

A software distribution system comprises a computer; a first distribution device; and a second distribution device, wherein the computer includes a first software reception unit configured to receive the software; a second software reception unit configured to receive the test program corresponding to the software; and a software execution unit configured to merge the software described in an executable format and the test program, and execute, the second software reception unit attempts to acquire a test program corresponding to the software at a timing at which the first software reception unit has received the software, and makes repeated attempts at a predetermined interval when the test program cannot be acquired, and the software execution unit merges the software and the test program at a timing at which the second software reception unit has received the test program.

5 Claims, 7 Drawing Sheets

(51) Int. Cl.
*H04L 29/06* (2006.01)
*G06F 9/445* (2006.01)
*H04L 29/08* (2006.01)

(56) References Cited

U.S. PATENT DOCUMENTS

| | | | | |
|---|---|---|---|---|
| 5,371,851 A | * | 12/1994 | Pieper et al. | 345/501 |
| 5,390,194 A | * | 2/1995 | Mannle | 714/744 |
| 5,655,121 A | * | 8/1997 | Delagi et al. | 717/124 |
| 5,859,963 A | * | 1/1999 | O'Dowd et al. | 714/38.1 |
| 5,950,004 A | * | 9/1999 | Bearse et al. | 717/146 |
| 6,038,378 A | * | 3/2000 | Kita et al. | 714/38.11 |
| 6,212,532 B1 | * | 4/2001 | Johnson et al. | 715/236 |
| 6,353,904 B1 | * | 3/2002 | Le | 714/726 |
| 6,721,713 B1 | * | 4/2004 | Guheen et al. | 705/1.1 |
| 7,315,826 B1 | * | 1/2008 | Guheen et al. | 705/7.29 |
| 7,403,901 B1 | * | 7/2008 | Carley et al. | 705/2 |
| 7,610,233 B1 | * | 10/2009 | Leong et al. | 705/37 |
| 7,730,452 B1 | * | 6/2010 | Li et al. | 717/124 |
| 8,121,874 B1 | * | 2/2012 | Guheen et al. | 705/7.11 |
| 2001/0052108 A1 | * | 12/2001 | Bowman-Amuah | 717/1 |
| 2003/0220780 A1 | * | 11/2003 | Fallah et al. | 703/21 |
| 2005/0034070 A1 | * | 2/2005 | Meir et al. | 715/530 |
| 2005/0251359 A1 | * | 11/2005 | Cao et al. | 702/120 |
| 2006/0059253 A1 | * | 3/2006 | Goodman et al. | 709/223 |
| 2006/0259949 A1 | * | 11/2006 | Schaefer et al. | 726/1 |
| 2008/0272372 A1 | * | 11/2008 | Luo et al. | 257/48 |
| 2009/0174451 A1 | * | 7/2009 | Pasqualini | 327/199 |
| 2011/0099424 A1 | * | 4/2011 | Rivera Trevino et al. | 714/25 |
| 2011/0107146 A1 | * | 5/2011 | Bose et al. | 714/32 |

\* cited by examiner

VERSION TABLE OF APPLICATION TEST CODE

| UPDATED VERSION OF APPLICATION | VERSION OF APPLICATION PRIOR TO UPDATING | NECESSARY APPLICATION TEST CODE |
|---:|---:|---:|
| 2.1 | 1.0 | 1.1, 1.2, 1.5, 2.0, 2.1 |
| 2.1 | 1.01 | 1.1, 1.2, 1.5, 2.0, 2.1 |
| 2.1 | 1.1 | 1.2, 1.5, 2.0, 2.1 |
| 2.1 | 1.2 | 1.5, 2.0, 2.1 |
| 2.1 | 1.5 | 2.0, 2.1 |
| 2.1 | 2.0 | 2.1 |
| 2.1 | 2.01 | 2.1 |

SOFTWARE DISTRIBUTION SYSTEM AND SOFTWARE DISTRIBUTION METHOD

CROSS REFERENCE TO RELATED PATENT APPLICATIONS

This application is a national phase of International Application No. PCT/JP2013/063162, titled "SOFTWARE DISTRIBUTION SYSTEM AND SOFTWARE DISTRIBUTION METHOD", filed on May 10, 2013, which claims the benefit of Japanese Patent Application No. 2012-108671, filed in the Japanese Patent Office on May 10, 2012, all of which applications are incorporated herein in their entireties by reference.

TECHNICAL FIELD

The present invention relates to a software distribution system.

BACKGROUND ART

Software acquisition via a network by devices connectable to the internet has recently become popular. Such devices include a great variety of devices from portable terminals such as smartphones to personal computers and onboard terminals for automobiles (such a terminal will be referred to hereinbelow as "client terminal"). The software created by developers is uploaded to a server for dissemination and downloaded to the client terminals automatically by the system or by the user's operation.

Meanwhile, where malicious software or software including a design miss is uploaded to a server, it can cause damage such as operational failure in the client terminal uploaded with such software, or an information leak in the terminal.

Accordingly, methods for performing operational tests of the developed software in an authentication agency and circulating only the software that has passed the tests are used to ensure software security. The invention described in Patent Document 1 relates to an access control method associated with such methods. In this invention, a certification agency generates certification information verifying that the software is secure and transmits the certification information together with the software to the client terminal. The client terminal determines the accessibility of the program on the basis of the certification information. As a result, the software that has not been certified as secure cannot be operated on the client terminal.

CITATION LIST

Patent Literature

Patent Literature 1: Japanese Patent Application Publication No. 2003-283494

SUMMARY OF INVENTION

However, since there are a variety of execution environments for smartphones and onboard terminals, sufficient operational verification sometimes cannot be performed under the fixed operational test environment of the authentication agency. For example, when a client terminal is an information terminal installed on an automobile, the tests cannot be performed unless various running states of the automobile are reproduced. The resultant problem is that complete operational verification is difficult to perform.

Accordingly, the applicant has suggested a software production method by which the operation of a program can be monitored while executing the program (Japanese Patent Application No. 2011-214992). More specifically, a monitoring program for verifying whether the input/output state or variables of the program which is the object of monitoring comply with specifications is simultaneously executed, and the operation that is not recommended by the program which is the object of monitoring is detected. The object of monitoring may be an application program or an operating system (OS) itself.

However, in most cases, the software operating in the clients terminal is frequently updated. The software update is performed to ensure security, eliminate bugs, and add functions. A restriction occurring when the above-described method is to be used when software or software update is distributed via a network is that the program which is the object of distribution and the monitoring program corresponding to this program should be disseminated simultaneously each time.

Thus, unless the software which is the object of dissemination and the corresponding monitoring program are provided in a set, a state can occur in which the software operating in the client terminal is not protected. For example, where the dissemination of a monitoring program corresponding to the OS of a new version is delayed when the OS of the client terminal is version-upped, the OS is not monitored till the monitoring program is received. Therefore, where a problematic code is included in the version-upped OS, it can be executed on the client terminal. In such a case, it is desirable that the monitoring program be acquired and used upon being prepared. However, the conventional software distribution service does not involve the feature of supplementing the software, which has already been disseminated, by subsequent transmission of a separate program that should be executed simultaneously therewith. In other words, the problem is that software cannot be in a protected state unless the user downloads manually a monitoring program with precise timing and starts monitoring the software.

The present invention has been created with consideration for the above-described problems, and it is an object thereof to provide a software distribution system capable of reducing the duration of a state in which the software is not protected.

The software distribution system in accordance with the present invention is constituted by a computer provided with a function of verifying the operation of software, a first distribution device that performs the distribution of software to the computer, and a second distribution device that performs the distribution of a test program, which is a program for verifying the software, to the computer. The first distribution device and the second distribution device are not necessarily separated and may be the same distribution device.

In order to resolve the aforementioned problems, the computer has a first software reception unit configured to receive the software from the first distribution device; a second software reception unit configured to receive the test program corresponding to the software from the second distribution device; and a software execution unit configured to merge the software described in an executable format and the test program, and execute the resulting software; the second software reception unit attempts to acquire a test program corresponding to the software at a timing at which the first software reception unit has received the software, and makes repeated attempts at a predetermined interval when the test program cannot be acquired; and the software execution unit merges the software and the test program at a timing at which the second software reception unit has received the test program.

The software to be distributed from the distribution device is a program executable by a computer or a library invoked from the program. The software to be distributed may be an operating system or an application program. Further, the software to be distributed does not necessarily operate independently. For example, it may be only the library invoked from the program, or a difference in a binary code.

The computer receiving the distribution of software requests that the distribution device acquire the corresponding test program at the timing at which the new software has been received from the distribution device. The acquisition request is repeatedly issued till the corresponding test program is obtained. With such a configuration, the computer can automatically acquire the test program even when the test program is prepared later than the main body of software is distributed. Therefore, the interval of time in which the distributed software is unprotected can be shortened.

Merging of programs, as referred to herein, indicates the preprocessing such as simultaneous execution of the corresponding test program when the software, which is the test object, is executed. For example, a test program is added to the software, which is the test program, and a program in an executable format is generated. When the test program is added, the processing contents of the software is changed such as to execute automatically the corresponding test program. As a result, the test program can be executed simultaneously with the software, which is the test object. Furthermore, a program for simultaneously starting the software, which is the test object, and the corresponding test program may be generated anew.

Where the distributed software and test program are merged at the client terminal side, the test program is also necessarily executed when the software is executed. Therefore, the software can be protected more reliably.

Further, the second distribution device may distribute a plurality of test programs corresponding to some, respectively different, functions of the software to be distributed.

For example, where a bug is found in a specific function of software and a version-up is performed to fix the bug, a test program is distributed that monitors only the function associated with the bug fixed by the version-up. Since the test program that monitors other functions has already been distributed, no distribution is performed. As a result, the data size of the test program can be reduced and the distribution time of the test program can be shortened. Further, by creating the test programs individually, it is possible to shorten the time till the test program is developed and distributed. The test program which is to be distributed may be an independent program monitoring only the object function, or may be a difference for updating the test program that has already been distributed.

The second software reception unit may acquire, from the second distribution device, a test program corresponding to another software for which the received software is needed when the first software reception unit performs software reception.

For example, when any software is updated, it is possible that another software that needs this software for execution will not operate correctly. In order to resolve this problem, the test program corresponding to the other software can be acquired automatically.

Further, the first and second distribution devices may be the same distribution device; the distribution device may further include: a software merging unit configured to generate merged software in which the software which is an object of distribution and a test program corresponding to this software are merged; and a merged software distribution unit configured to distribute the merged software to the computer; and when the test program corresponding to the software which is the object of distribution is stored in the distribution device, the software merging unit may generate merged software from the software which is the object of distribution and the test program, and the merged software distribution unit may distribute the merged software.

With such a configuration, when a test program corresponding to the software which is the object of distribution is ready on the distribution device, the software and the test program can be merged in advance and then distributed. Further, since the software and test program can be also distributed separately, the software can be also distributed individually when the corresponding test program has not been ready at the software distribution stage.

Further, the present invention can be also specified as a software distribution system including at least some of the abovementioned means. The present invention can be also specified as a software distribution method including at least some of the processes performed by the abovementioned means. The abovementioned processes and means can be also implemented in freely selected combinations, provided that it causes no technical contradictions.

The present invention can provide a software distribution system capable of reducing the duration of a state in which the software is not protected.

Further features of the present invention will become apparent from the following description of exemplary embodiments with reference to the attached drawings.

DESCRIPTION OF EMBODIMENTS

First Embodiment

<System Configuration>

The software distribution system according to the first embodiment is explained below. The software distribution system according to the first embodiment is constituted by a computer 100 having a function of updating an operating system via a network, a distribution device 200A that distributes the operating system to the computer, and a distribution device 200B that distributes a system test code to the computer. In the explanation of the present embodiment, a system library indicates the entire operating system for operating the computer 100, or part of the operating system, and a system test code indicates a test program for monitoring the operation of the operating system.

Figure 1:
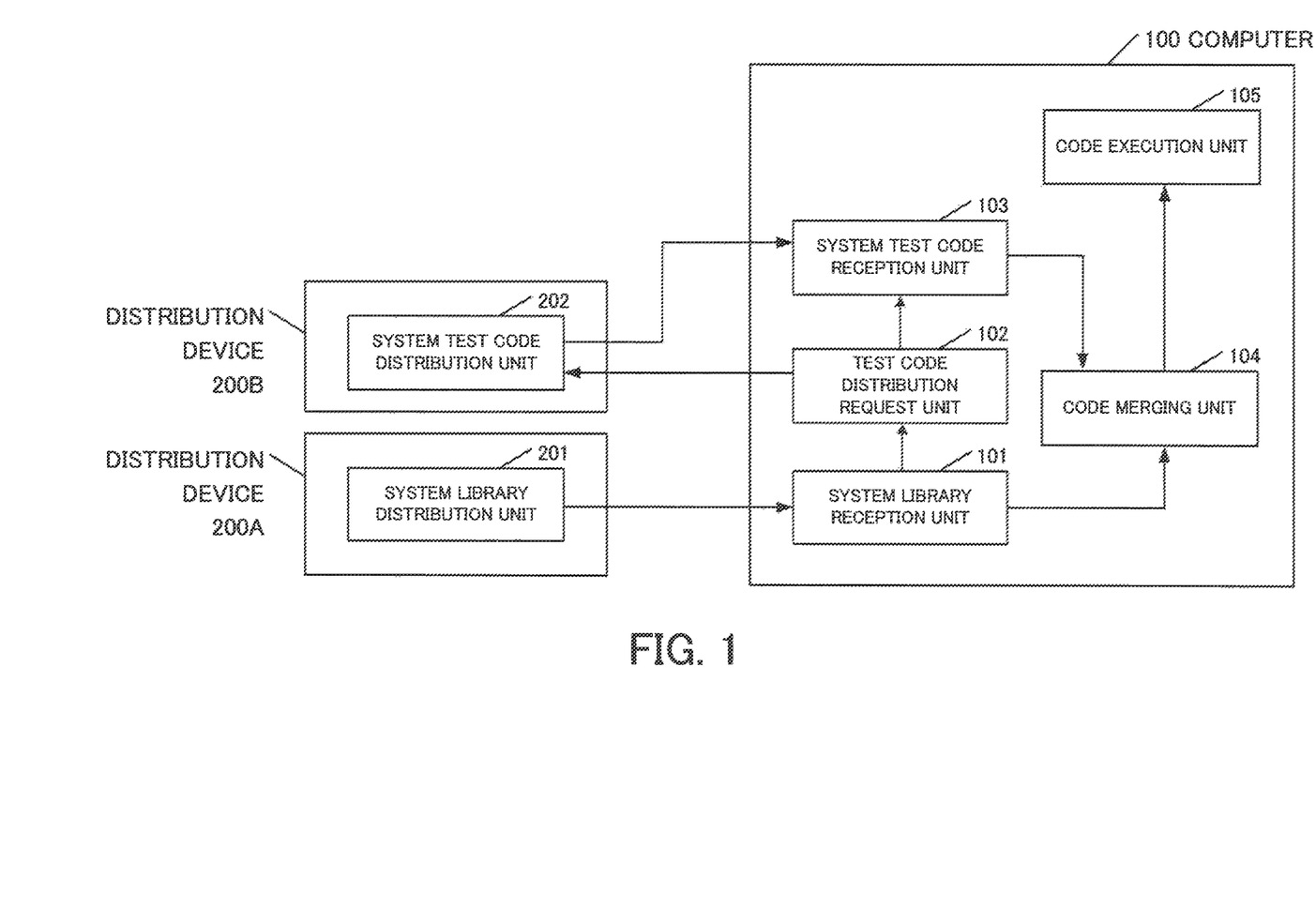
FIG. 1 is a system configuration diagram of the software distribution system according to the first embodiment.

FIG. 1 is a system configuration diagram of the software distribution system according to the present embodiment. The computer 100 has a CPU, a main storage device, and an auxiliary storage device (none is shown in the figure). The program stored in the auxiliary storage device is loaded into the main storage device and executed by the CPU, thereby causing the operation of the means shown in FIG. 1. The distribution device 200A or 200B can be also realized by a computer, and the entire distribution device 200A or 200B or part thereof may be also executed by using a specially designed circuit.

First, the computer 100 is explained. The computer 100 has a system library reception unit 101, a test code distribution request unit 102, a system test code reception unit 103, a code merging unit 104, and a code execution unit 105. The computer 100 may be a personal computer, an onboard terminal, or a portable information terminal. It may also be a computer capable of executing any software, including an operating system, middleware, and user applications.

The system library reception unit 101 is a unit configured to receive, via a network, a system library, which is the test object, and is the first software reception unit in accordance with the present invention. All software necessary when the system is updated is included in the system library which is to be received.

The test code distribution request unit 102 is a unit configured to request a distribution device to distribute a system test code corresponding to the updated system. The system test code reception unit 103 is a unit configured to receive from the distribution device 200B the system test code requested by the test code distribution request unit 102. The test code distribution request unit 102 and the system test code reception unit 103 are the second software reception unit in accordance with the present invention.

The code merging unit 104 is a unit configured to merge the received system test code with the operating system. The code merging may be performed with respect to the received library or with respect to the updated operating system obtained by updating the operating system stored in the computer by using the received system library.

The code merging as referred to herein represents the processing such that the software, which is the test object, and the test program are executed simultaneously as indicated hereinabove. In the present embodiment, the processing is added in which the system test code is added to the code of the updated operating system, and the system test code is executed simultaneously with the execution of the operating system. The specific method is described below.

Where the code merging is the processing for starting the operating system and test program simultaneously, it is not always necessary to add up the programs. For example, the processing of starting the test program simultaneously with the system start may be generated.

The code execution unit 105 is a unit configure to execute the program obtained by merging performed by the code merging unit 104. The test of the software, which is the test object, is started by executing the program obtained by adding in the code merging unit 104. The code merging unit 104 and the code execution unit 105 are the software execution unit in accordance with the present invention.

The distribution devices 200A and 200B are described below. The distribution device 200A is the first distribution device in accordance with the present invention, and the distribution device 200B is the second distribution device in accordance with the present invention.

The system library distribution unit 201 is a unit configured to store the system library operated on the computer 100 and distribute the stored library to the computer 100. As mentioned hereinabove, the stored and distributed system library may be the entire operating system, or only a module necessary for updating the operating system.

The system test code distribution unit 202 is a unit configured to store a system test code, which is a program for monitoring the system library that is the distribution object, and distribute the stored system test code to the computer 100. The system test code distribution unit 202 stores the version of the system library distributed by the system library distribution unit 201 and the system test code of the corresponding version, but it is not always necessary to store the system test code of the corresponding version. For example, the distribution of the system library may be initially performed and the system test code may be stored later in order to prioritize the fixing of bugs in the system.

<Processing Flow>

Figure 2:
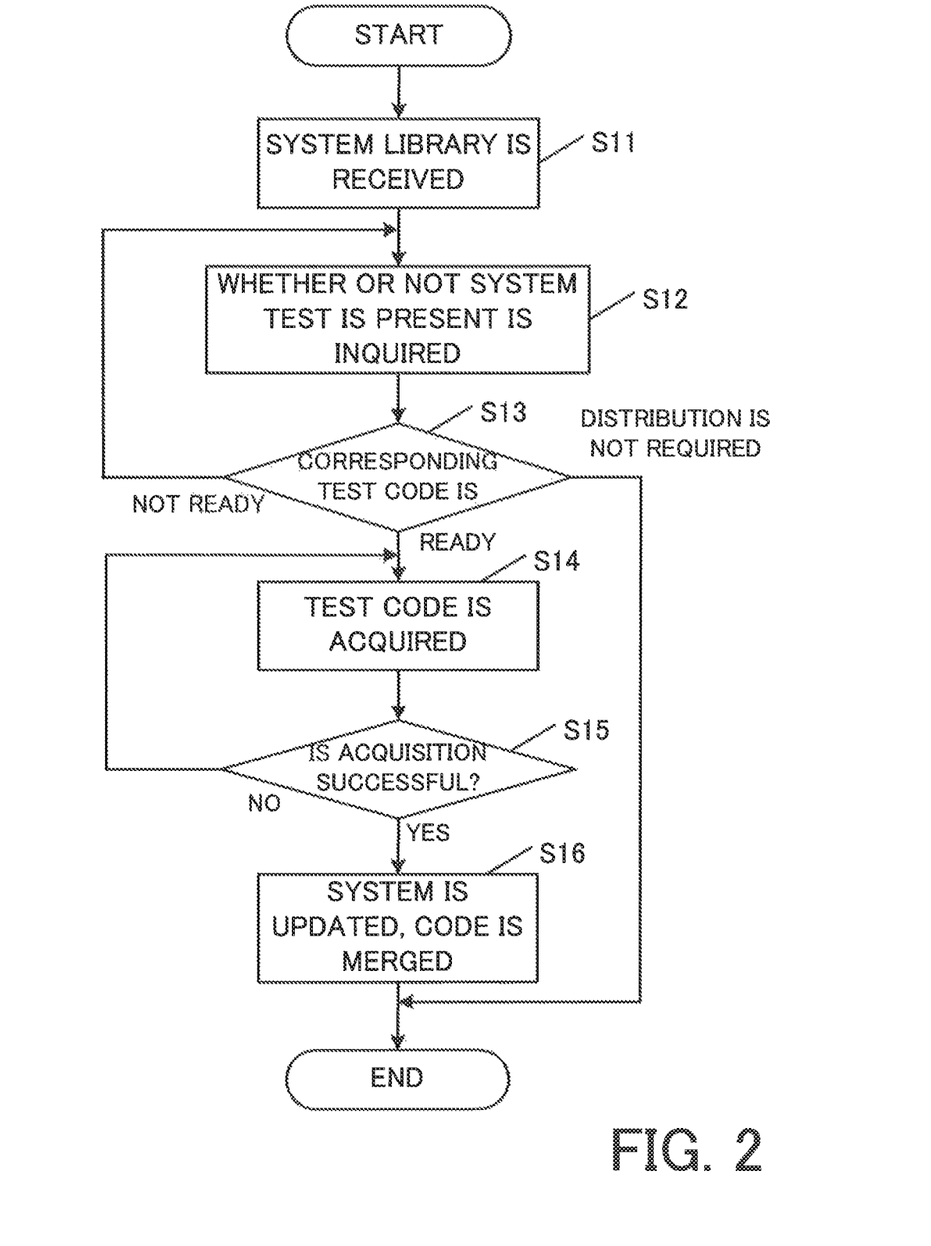
FIG. 2 is a processing flowchart of the software distribution system according to the first embodiment.

The processing performed by the software distribution system according to the present embodiment is described below in greater detail. FIG. 2 is a flowchart representing the processing in which the computer 100 receives a system library from the distribution device 200A, receives a system test code from the distribution device 200B, and generates an execution module.

First, the system library reception unit 101 requests the distribution of a system library from the system library distribution unit 201 and receives the distributed system library (S11). The received system library is transmitted to the code merging unit 104.

Then, the test code distribution request unit 102 inquires the system test code distribution unit 202 as to whether a system test code corresponding to the received system library is present (S12). More specifically, the version of the system test code that has already been stored in the computer 100 and the version of the system library that has been distributed are transmitted to the distribution device, and the system test code distribution unit 202 determines whether a system test code that needs to be updated is present.

The results of the determination performed by the system test code distribution unit 202 in step S12 can be classified into the following three groups.

(1) A state is assumed in which the system test code needs to be updated and the system test code of the conforming version can be distributed. Accordingly, a notification to this effect is issued.

(2) The system test code is not needed to be updated. Accordingly, a notification to this effect is issued.

(3) The system test code needs to be updated, but the distribution is not ready. Accordingly, a notification to this effect is issued.

When the system test code needs to be updated and the distribution is possible, the processing advances to step S14, and the distribution of the system test code of the version that should be distributed is started (the aforementioned group (1)).

When the system test code is not needed to be updated, for example, when the system library functions are not significantly enlarged or changed, a response to the effect that the distribution is not required is returned. In this case, the processing ends (the aforementioned group (2)).

Meanwhile, when the system is updated, an urgent release may be sometimes performed to fix the bugs. In such a case, the modification of the system library can be prioritized and the preparation of the test code can be delayed. Where the test code is not ready, even if there is an inquiry from the test code distribution request unit 102, the version of the corresponding test code cannot be returned as a response. In such a case, the system test code distribution unit 202 returns a response to the effect that the distribution is not ready to the test code distribution request unit 102. In this case, the processing returns to step S12 and the inquiry is repeated after an interval of several minutes or hours. The interval can be selected randomly (the aforementioned group (3)).

In step 314, the system test code reception unit 103 receives the system test code of the corresponding version. Where the reception is successful (S15—Yes), the received system test code is transmitted to the code merging unit 104. Where the reception has failed (S15—No), a second attempt is made after a predetermined interval of time.

The code merging unit 104 then updates the operating system by using the received system library. Where the update is completed, the code merging unit 104 merges the operating system with the system test code (S16). The technique of adding a separate program code to a program code in an executable format and controlling the execution thereof is described, for example, in Japanese Patent Application Publication No. 2002-229790.

More specifically, the test program is attached to the end of the program that is the object of test, and an entry point (execution start address) held in the header of the execution file is changed to the address of the test program. The test program copies a portion of the merged code, other than itself, that is, only the program that is the test object, to the storage device and causes the execution thereof. As a result, where the program that is the test object is attempted to be executed, the test program is initially started and then the test program starts the program that is the test object. Therefore, both programs can be executed simultaneously.

The generated execution module is transmitted to the code execution unit 105 and the processing is ended. Where the operating system is executed by the code execution unit 105, the system test code is started and the system monitoring is initiated.

With the first embodiment, the corresponding test code is requested with respect to the distribution device at a timing at which the system is updated. Where the test code is not ready, the distribution request is repeatedly and periodically issued till the test code can be acquired, and the merging of the test code is implemented at the timing of acquisition. With such a configuration, the interval of time in which the system is not protected by the test code can be minimized.

Second Embodiment

In the software distribution system according to the second embodiment, a distribution device distributes an application program to a client terminal via a network. Further, in the second embodiment, only the minimum necessary code is distributed when the test code is distributed. The objective of distributing the software and test program is the same as in the first embodiment, and only the type of the transmitted software is different. The means same as those of the first embodiment are assigned with same reference numerals and the explanation thereof is herein omitted. The operation other than that of the below-described steps is the same as in the first embodiment.

Figure 3:
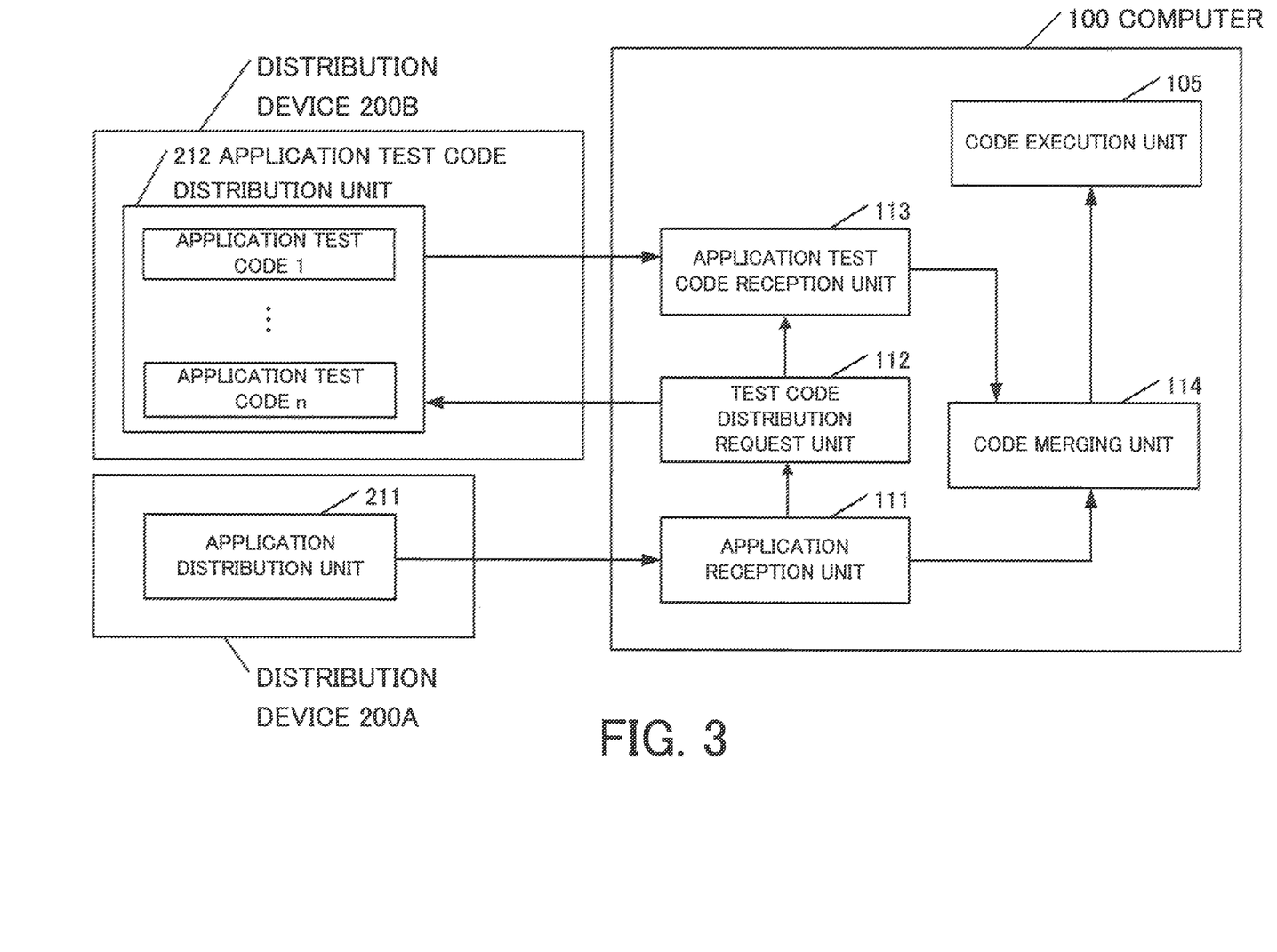
FIG. 3 is a system configuration diagram of the software distribution system according to the second embodiment.

FIG. 3 is the system configuration diagram of the software distribution system according to the second embodiment.

An application reception unit 111 is a unit configured to receive an application program distributed by the distribution device 200A. The processing contents are the same as those of the system library reception unit 101, only the type of the received software being different.

A test code distribution request unit 112 is a unit configured to request the distribution device 200B to distribute an application test code which is a test program corresponding to the updated application program. The processing contents are the same as those of the test code distribution request unit 102, only the type of the requested test code being different.

An application test code reception unit 113 is a unit configured to receive the application test code distributed from the distribution device 200B. The processing contents are the same as those of the system test code reception unit 103, only the software, which is the object for the test code, being different.

A code merging unit 114 is a unit configured to merge the received application test code with the application program. The processing contents are the same as those of the code merging unit 104, only the type of the software, which is the object, being different.

An application distribution unit 211 is a unit configured to store the application program operated on the computer 100 and distribute the application program to the computer 100. The application program, which is to be distributed, may be the entire application, or only a module or difference necessary for updating. The processing contents are the same as those of the system library distribution unit 201, only the type of the software, which is to be distributed, being different.

An application test code distribution unit 212 is a unit configured to store the application test code, which is a program for monitoring the application program, and distribute the application test code to the computer 100. This unit is similar in functions to the system test code distribution unit 202 of the first embodiment, but the method for storing the application test code is different. The system test code distribution unit 202 stores the test code corresponding to the entire distributed system library, but the difference from the first embodiment is that the application test code distribution unit 212 in the present embodiment stores individually a test code corresponding to some of the functions of the application program which is to be distributed.

This difference is explained below. Software is mainly updated to add functions and fix the bugs, and where the same test code is transmitted again with respect to the functions that have not been updated, the communication band is unnecessarily consumed. Accordingly, the test codes are divided into the corresponding functions or modules are stored, and only the test code corresponding to the portion changed by the update is transmitted. The division of the test codes can be performed in any units.

The difference between the contents of the processing performed by the computer 100 in the second embodiment and that in the first embodiment is described below.

In step S11, the application reception unit 111 request the application distribution unit 211 to distribute an application program and receives the distributed application program.

Figure 4:
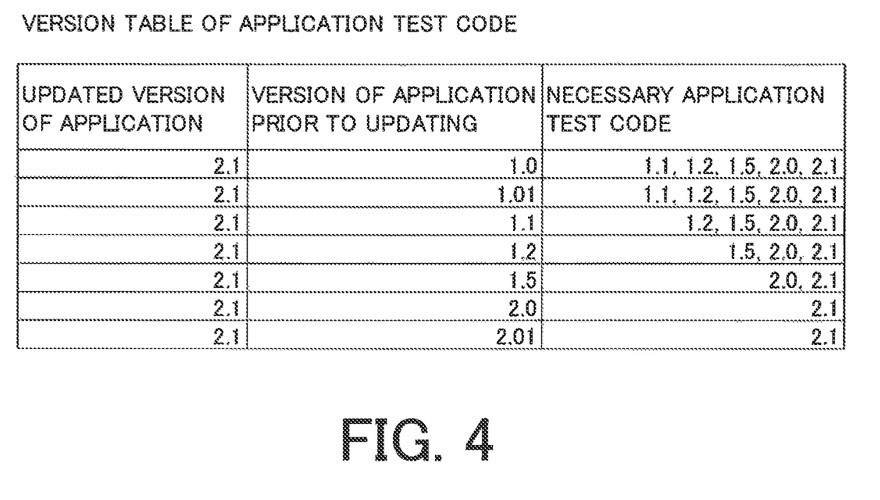
FIG. 4 is a table for determining the version of the necessary application test code.

In step 312, the application test code distribution unit 212 inquires, by the same method as in the first embodiment, as to whether or not the application test code corresponding to the version of the received application program is present. Information on the type of the version of the application test code that should be distributed may be held, for example, by the application test code distribution unit 212 in a table format such as shown in FIG. 4. In the present embodiment, only the test code corresponding to the changed function of the application program is distributed. Therefore, the number of application test codes, which are to be acquired, is also reduced for newer versions of the application prior to updating. In the example shown in FIG. 4, for example, where the version of the application program prior to updating is 1.5, the application test codes having the versions of 2.0 and 2.1 are the distribution objects.

The processing of step S13 is the same as in the first embodiment.

In step 314, the application test code reception unit 113 receives the application test code which is the object. The processing of steps S15 to 316 is the same as in the first embodiment.

In the second embodiment, only the test code corresponding to the function or module changed by updating is distributed. The resultant merits are that the size of the test code can be restricted and the consumption of the communication band can be reduced. Further, since the development scale of the test program is reduced, the time till the preparation for the distribution is completed can be shortened.

Third Embodiment

In the third embodiment, a function of merging a system library and a system test code is added to the distribution device according to the first embodiment. Where the corresponding system test code is ready when the distribution of the system library is started, the system test code and system library are merged and distributed at the distribution device side. Where the corresponding system test code is not ready, the system test code and system library are distributed individually. The means same as those of the first embodiment are assigned with same reference numerals and the explanation thereof is herein omitted. The operation other than that of the below-described steps is the same as in the first embodiment.

Figure 5:
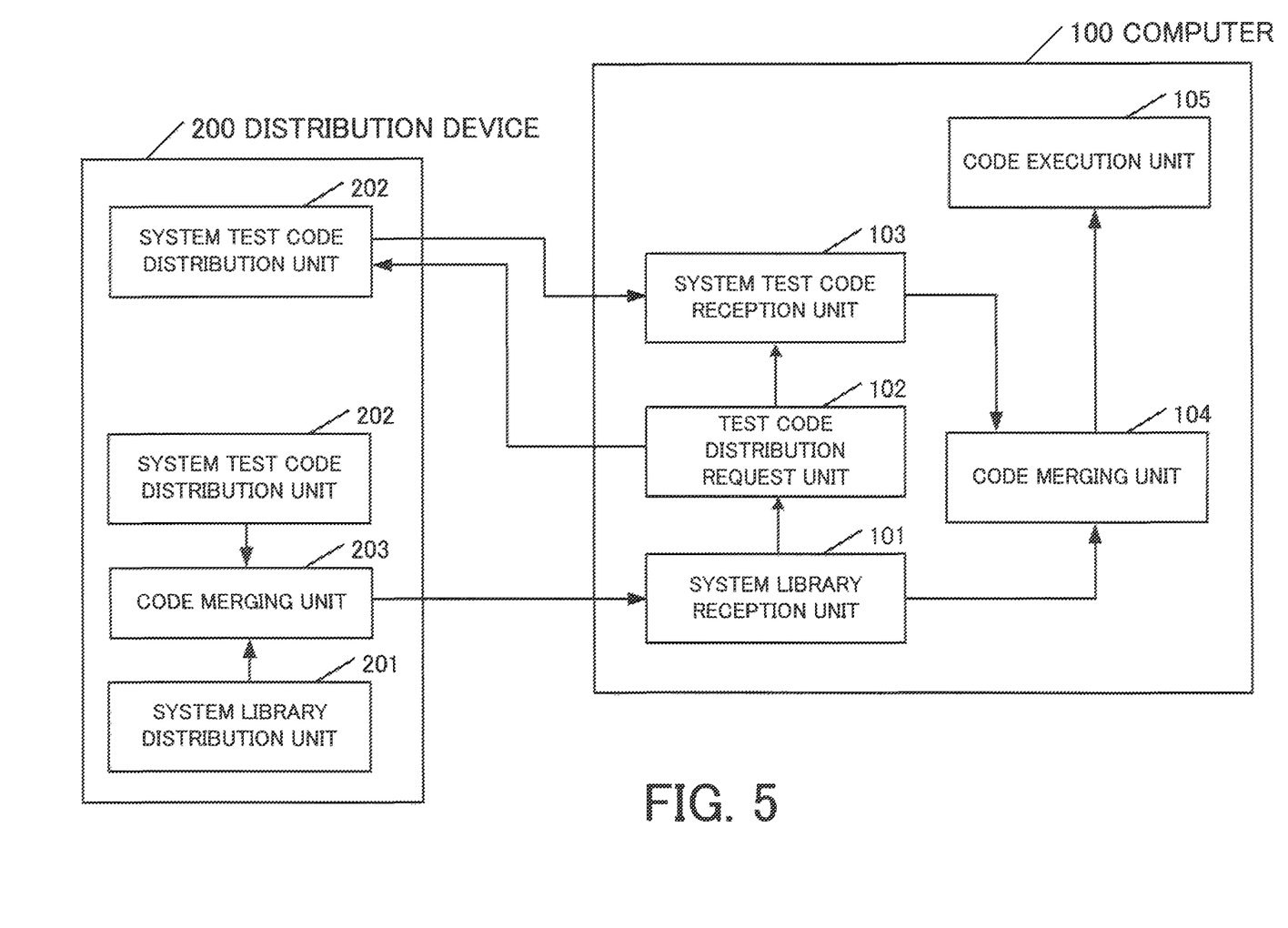
FIG. 5 is a system configuration diagram of the software distribution system according to the third embodiment.

FIG. 5 is the system configuration diagram of the software distribution system according to the third embodiment.

The operation of the system library distribution unit 201 and the system test code distribution unit 202 is similar to that in the first embodiment, but the difference from the first embodiment is that the system library and system test code, which are the objects of distribution, are transmitted via a code merging unit 203. Further, in the present embodiment, the distribution device that distributes the system library and the distribution device that distributes the system test code are the same distribution device 200.

The code merging unit 203 is a unit configured to merge the system library and system test code, generate a single execution module, and distribute the merged program to the computer 100, in the same manner as the code merging unit 104. However, code merging is performed only when the corresponding test code is ready in the distribution device when the distribution of the system library is started. When the corresponding system test code is not ready, the code merging is not performed and the distribution is carried out in the same manner as in the first embodiment. The code merging unit 203 is the software merging unit and merged software distribution unit in accordance with the present invention.

The difference in the contents of the processing performed by the computer 100 in the third embodiment from that in the first embodiment is described below.

In step S11, the system library reception unit 101 requests the distribution of a system library from the code merging unit 203. When a system test code corresponding to the system library of the requested version has been stored in the distribution device, the code merging unit 203 merges and distributes the system library and the corresponding system test code. Otherwise, only the system library is distributed without merging.

Then, in step S12, the test code distribution request unit 102 inquires the distribution device as to whether the system test code corresponding to the received system library is present, in the same manner as in the first embodiment. When the received system library has been merged in the distribution device, the corresponding system test code has already been acquired. Therefore, steps S12 to S16 are skipped and the processing is ended.

Where the received system library has not been merged in the distribution device and the corresponding system test code is ready in the distribution device distribution (that is, the system test code has been added thereafter), the processing moves to step S14 and the system test code reception unit 103 acquires the system test code. Further, where the received system library has not been merged in the distribution device and the corresponding system test code is not ready for distribution, the processing again moves to step S12. The processing of steps S15 and S16 is similar to that of the first embodiment.

According to the third embodiment, where the corresponding system test code is ready when the distribution of the system library is started, the code is merged at the distribution device side, and when the system test code is not ready, the distribution can be performed individually. As a result, a load on the client terminal can be reduced, and the system can be adapted to the case in which the system test code is prepared at a later stage.

Fourth Embodiment

In the fourth embodiment, a test code relating to an application program is also simultaneously requested when a system library is received and the operating system is updated.

When the operating system is updated, an application program sometimes does not operate correctly due to a compatibility problem. For example, the specifications of the API used in the application are sometimes changed by the version-up of the operating system. In such a case, where the application test code does not correspond to the newest operating system, it is impossible to determine whether the application program does not operate correctly due to system limitations, or because of a simple bug. In the fourth embodiment, the acquisition of the newest test code relating to the application is attempted simultaneously with the system update in order to resolve this problem. The means same as those of the first embodiment are assigned with same reference numerals and the explanation thereof is herein omitted.

Figure 6:
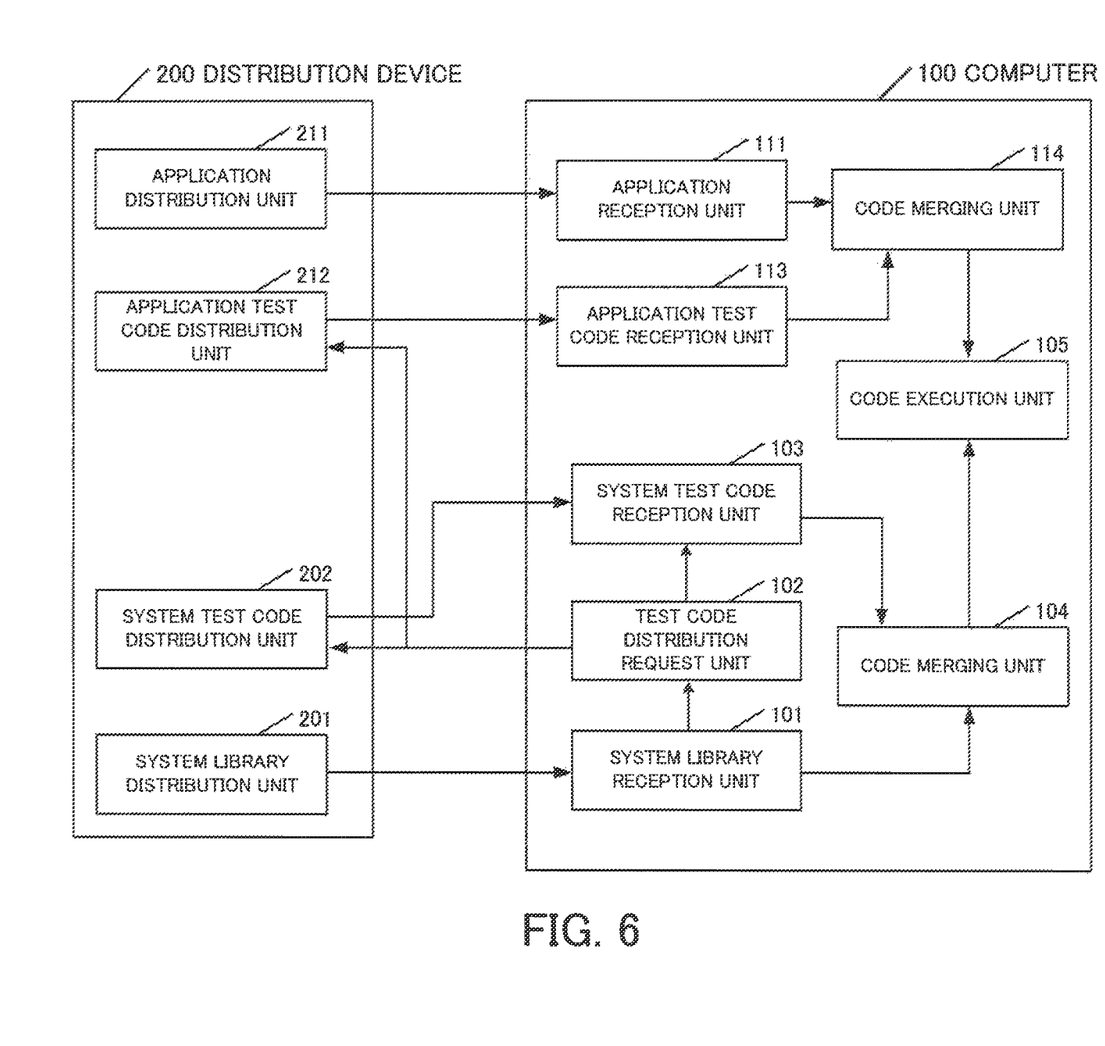
FIG. 6 is a system configuration diagram of the software distribution system according to the fourth embodiment.

FIG. 6 is the system configuration diagram of the software distribution system according to the fourth embodiment.

The test code distribution request unit 102 is a unit configured to request the distribution device 200 to distribute a system test code corresponding to the updated system. The difference from the first embodiment is that the distribution device 200 is simultaneously requested to distribute an application test code corresponding to the updated system. In the present embodiment, the distribution device distributing the system library and the distribution device distributing the system test code are configured as the same distribution device 200.

Figure 7:
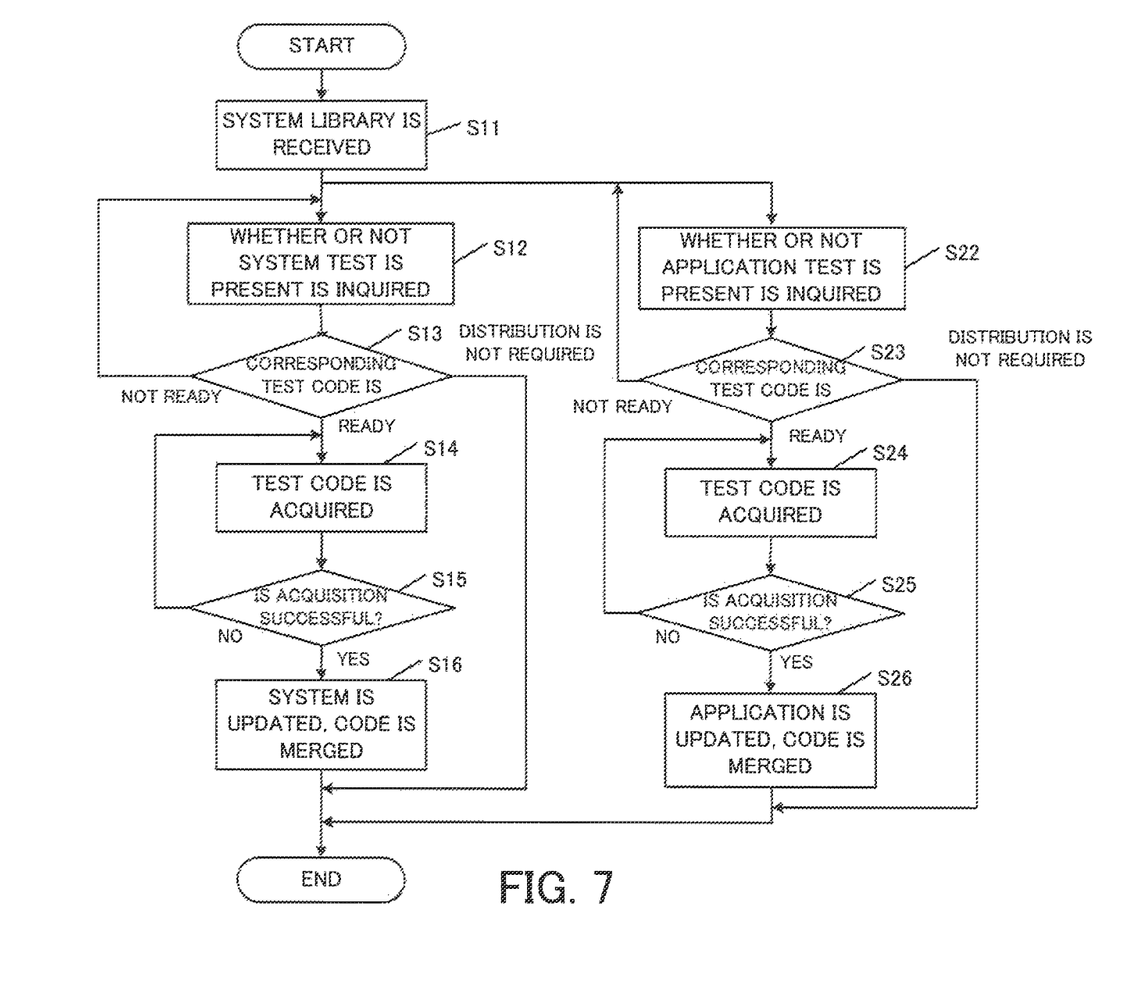
FIG. 7 is a processing flowchart of the software distribution system according to the fourth embodiment.

FIG. 7 is a flow chart of the processing performed by the computer 100 in the fourth embodiment. The processing of steps S11 to S16 updates the system and is the same as in the first embodiment.

Upon completion of step S11, the test code distribution request unit 102 inquires the distribution device as to whether the necessary application test code is present, in the same manner as in the second embodiment (S22). The essence of the inquiry is: "IS APPLICATION TEST CORRESPONDING TO VERSION OF UPDATED SYSTEM PRESENT?". Thus, the test code distribution request unit 102 simultaneously transmits the version of the updated system library and checks whether an update is needed with respect to all of the application test codes that have been stored.

In this case, where the corresponding application test code has not been prepared for distribution, the test code distribution request unit 102 returns the processing to step S22 and attempts to make a request again by the same method as in the first embodiment. Where the corresponding application test code has been prepared, all of the application test codes of the corresponding versions are acquired in step S24. The received application test codes are transmitted to the code merging unit 104 and code merging is performed (S26). Where only some of a plurality of application test codes have been prepared, the acquirable codes may be acquired ahead of others.

Thus, in the fourth embodiment, the acquisition of then newest application test code is interlocked with the system update. As a result, when the version-up of the operating system is performed, the monitoring of the application program can be prevented from being performed incorrectly.

Variation Example

The above-described embodiments are exemplary embodiments explained to illustrate the present invention, and the present invention can be implemented by changing or combining, as appropriate, those embodiments, without departing from the scope of the invention. For example, in the first and second embodiments, the distribution device distributing the software and the distribution device distributing the test program are separate devices, but the software and test program may be also distributed from the same distribution device. Further, in the first embodiment, the operating system is tested, but the application program may be also the object of testing. Likewise, in the second embodiment, the application program is tested, but the operating system may also the object of testing. The contents of processing described in the embodiments may be combined.

Further, the test programs described in the embodiments may be of any type, provided that the validity of software, which is to be executed, is verified. For example, whether the method for invoking the API (Application Programming Interface), which is to be used, is correct may be verified and the result may be recorded, or the access to an unrecognized resource may be detected and blocked.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-108671, filed on May 10, 2012, which is hereby incorporated by reference herein in its entirety.

REFERENCE SIGNS 100 computer
200 distribution device
101 system library reception unit
102 test code distribution request unit
103 system test code reception unit
104 code merging unit
105 code execution unit
111 application reception unit
112 test code distribution request unit
113 application test code reception unit
201 system library distribution unit
202 system test code distribution unit
203 code merging unit
211 application distribution unit
212 application test code distribution unit

The invention claimed is:

1. A software distribution system comprising:
a computer provided with a function of verifying the operation of software;
a first distribution device that performs the distribution of software to the computer; and
a second distribution device that performs the distribution of a test program, which is a program for verifying the software, to the computer, wherein
the computer includes:
a first software reception unit configured to receive the software from the first distribution device;
a second software reception unit configured to receive the test program corresponding to the software from the second distribution device; and
a software execution unit configured to merge the software described in an executable format and the test program, and execute the resulting software, the second software reception unit attempts to acquire a test program corresponding to the software at a timing at which the first software reception unit has received the software, and makes repeated attempts at a predetermined interval when the test program cannot be acquired, and
the software execution unit merges the software and the test program at a timing at which the second software reception unit has received the test program.

2. The software distribution system according to claim 1, wherein
the second distribution device distributes a plurality of test programs corresponding to some, respectively different functions of the software to be distributed.

3. The software distribution system according to claim 1, wherein
the second software reception unity acquires, from the second distribution device, a test program corresponding to another software for which the received software is needed when the first software reception unit performs software reception.

4. The software distribution system according to claim 1, wherein
the first and second distribution devices are the same distribution device,
the distribution device further includes:
a software merging unit configured to generate merged software in which the software which is an object of distribution and a test program corresponding to this software are merged; and
a merged software distribution unit configured to distribute the merged software to the computer, and
when the test program corresponding to the software which is the object of distribution is stored in the distribution device,
the software merging unit generates merged software from the software which is the object of distribution and the test program and the merged software distribution unit distributes the merged software.

5. A software distribution method comprising:
providing a computer with a function of verifying the operation of software;
performing, by a first distribution device, the distribution of software to the computer;
performing, by a second distribution device, the distribution of a test program, which is a program for verifying the software, to the computer; receiving, by a first software reception unit of the computer, the software from the first distribution device;

receiving, by a second software reception unit of the computer, the test program corresponding to the software from the second distribution device;

merging, by a software execution unit of the computer, the software described in an executable format and the test program, executing, by a processor, the resulting software;

attempting, by the second software reception unit of the computer, to acquire a test program corresponding to the software at a timing at which the first software reception unit has received the software, and making repeated attempts at a predetermined interval when the test program cannot be acquired, and merging, by the software execution unit of the computer, the software and the test program at a timing at which the second software reception unit has received the test program.

* * * * *